Nov. 7, 1961  M. C. LANGE  3,007,743
WHEEL ORNAMENT
Filed March 19, 1958

Marvin C. Lange
INVENTOR.

BY Clarence A. O'Brien
and Harvey B. Jacobson
Attorneys

3,007,743
WHEEL ORNAMENT
Marvin C. Lange, 605 South St., Rockwell City, Iowa
Filed Mar. 19, 1958, Ser. No. 722,557
1 Claim. (Cl. 301—37)

The present invention relates to new and useful improvements in ornaments particularly for the wheels or bicycles, tricycles and motorcycles, although it will be understood, of course, that the device may be used on any other wheels for which it may be found adapted and desirable.

The primary object of the present invention is to provide, in a manner as hereinafter set forth, an ornament of the character described comprising novel means whereby it may be expeditiously mounted on the usual rim of a conventional cycle wheel without structurally altering said rim.

Other objects of the invention are to provide a wheel ornament of the aforementioned character which will be comparatively simple in construction, strong, durable, compact, of light weight, attractive in appearance and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
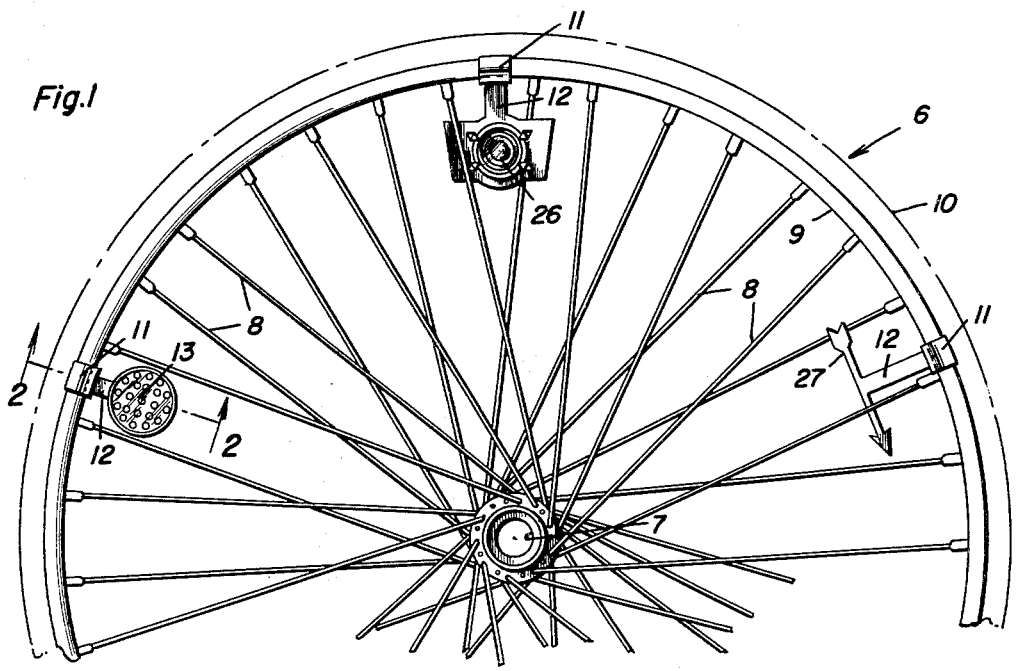
FIGURE 1 is a view in side elevation of a portion of a bicycle wheel having mounted thereon a plurality of ornaments constructed in accordance with the present invention.

Referring now to the drawing in detail and to FIGURE 1 thereof in particular, it will be seen that reference character 6 designates generally a portion of a conventional bicycle wheel comprising a hub 7, wire spokes 8, and the usual rim 9 having mounted thereon a pneumatic tire 10.

Figure 2:
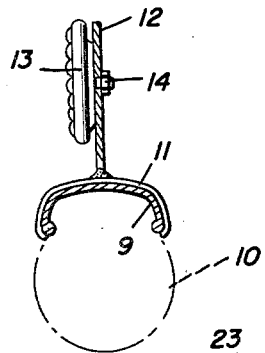
FIGURE 2 is an enlarged view in transverse section, taken substantially on the line 2—2 of FIGURE 1.

The embodiment of the present invention which has been illustrated in FIGURE 2 of the drawing comprises a substantially C-shaped clip or clamp 11 of suitable resilient material which is adapted to be snapped on the rim 9. Fixed on the clip 11 at an intermediate point and projecting inwardly therefrom is a bracket 12 in the form of an apertured bar. An ornament 13 in the form of a reflector button is secured on the bracket 12, as at 14.

It is throught that the use of the device will be readily apparent from a consideration of the foregoing. Briefly, the resilient clip or clamp 11 is snapped on the rim 9 in an obvious manner between any pair of the spokes 8. Any desired number of the devices may be thus applied to the wheel 6. As the wheel 6 turns the ornament 13 deflects light in an attractive manner, the device being particularly effective at night.

Figure 3:
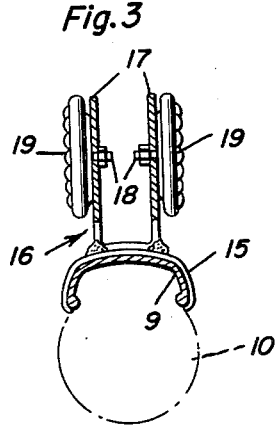
FIGURE 3 is a view substantially similar to FIGURE 2 through a modified form of the device.
Figure 4:
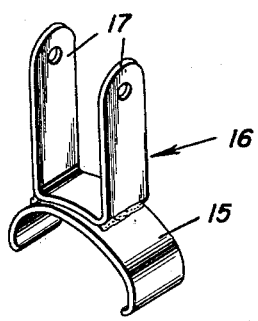
FIGURE 4 is a perspective view of the modification of FIGURE 3 without the ornaments.

In the embodiment of FIGURES 3 and 4 of the drawing, reference character 15 designates a resilient, substantially C-shaped clip or clamp which is similar to the clip 11 and which is adapted to be snapped on the wheel rim 9. Fixed at an intermediate point on the resilient clip 15 is a substantially U-shaped bracket 16 of suitable material. The legs 17 of the bracket 16 are apertured and have secured thereon, as at 18, a pair of outwardly facing reflector buttons 19 which are substantially similar to the reflector button 13.

Figure 5:
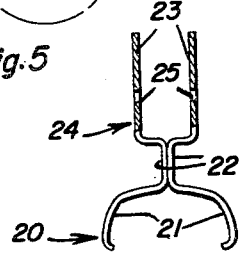
FIGURE 5 is an elevational view, partially in section, of another modification without the ornaments.

In the embodiment of FIGURE 5 of the drawing, reference character 20 designates generally a resilient, substantially C-shaped clip or clamp to be snapped on the rim 9. The clip 20 comprises two pieces of material formed to provide opposed jaws 21 for the reception of the rim 9 therebetween. Extending from the adjacent ends of the jaws 21 and secured together as by soldering or welding is a pair of arms 22 which terminate in outwardly offset end portions 23 providing a substantially U-shaped bracket 24 on which a pair of the ornament may be mounted as in FIGURE 3 of the drawing. Toward this end, the bracket 24 is provided with apertures 25. Various ornaments other than reflector buttons may be used, as indicated at 26 and 27 in FIGURE 1 of the drawing.

The foregoing is considered as illustrative only of the principles of the invention. Further, since numerous modifications and changes will readliy occur to those skilled in the art, it is not desired to limit the invention to the exact construction and operation shown and described, and accordingly all suitable modifications and equivalents may be resorted to, falling within the scope of the invention as claimed.

What is claimed as new is as follows:

An ornament for vehicle wheels of the type including a rim of generally C-shaped transverse section, said ornament comprising a resilient, generally C-shaped clip mounted under tension on the rim, a bracket mounted on said clip, said bracket including a pair of spaced, opposed, apertured legs having one end affixed to the clip at circumferentially spaced points, and a pair of oppositely outwardly facing reflector buttons mounted on said legs.

References Cited in the file of this patent

UNITED STATES PATENTS

| | | |
|---|---|---|
| Re. 18,692 | Clark | Dec. 20, 1932 |
| 675,063 | Kift | May 28, 1901 |
| 1,413,530 | Harned | Apr. 18, 1922 |
| 1,950,082 | Farr | Mar. 6, 1934 |
| 2,041,332 | Golden | May 19, 1936 |
| 2,174,087 | Horn | Sept. 26, 1939 |
| 2,347,234 | Allen | Apr. 25, 1944 |
| 2,396,080 | Bruegger | Mar. 5, 1946 |
| 2,495,860 | Miller | Jan. 31, 1950 |
| 2,621,081 | Mann | Dec. 9, 1952 |

FOREIGN PATENTS

| | | |
|---|---|---|
| 412,844 | Germany | May 2, 1925 |
| 380,279 | Great Britain | Sept. 15, 1932 |
| 134,346 | Austria | July 25, 1933 |
| 421,321 | Great Britain | Dec. 18, 1934 |